United States Patent Office 3,738,958
Patented June 12, 1973

3,738,958
SYNERGISTIC FLAME RETARDING COMPOSITION FOR POLYPROPYLENE OF 1,2,3,4,5-PENTABROMO - 6 - CHLOROCYCLOHEXANE, TETRABROMOPHTHALIC ANHYDRIDE AND ANTIMONY TRIOXIDE
Henry N. Paul 3rd, Blue Bell, Pa., assignor to Thiokol Chemical Corporation, Bristol, Pa.
Continuation-in-part of abandoned application Ser. No. 126,815, Mar. 22, 1971. This application Feb. 10, 1972, Ser. No. 225,233
Int. Cl. C08f 45/59
U.S. Cl. 260—45.75 B                    11 Claims

ABSTRACT OF THE DISCLOSURE

Self-extinguishing compositions are obtained from normally flammable polypropylene materials by the addition of a synergistic acting flame retarding composition containing from about 20 to 60% by weight 1,2,3,4,5-pentabromo-6-chlorocyclohexane, 30 to 70% by weight tetrabromophthalic anhydride and 1 to 30% by weight antimony trioxide based on the total weight of the flame retarding composition.

CROSS-REFERENCE TO RELATED APPLICATION

This application is a continuation-in-part of application Ser. No. 126,815, filed Mar. 22, 1971, now abandoned.

BACKGROUND OF THE INVENTION

Field of the invention

This invention relates to a synergistic-acting composition containing 1,2,3,4,5-pentabromo-6-chlorocyclohexane, tetrabromophthalic anhydride and antimony trioxide for rendering normally flammable polypropylene materials self-extinguishing when intimately incorporated therein.

This invention also pertains to a self-extinguishing textile fabric of polypropylene. More particularly, it relates to a self-extinguishing polypropylene carpet backing.

DESCRIPTION OF THE PRIOR ART

Many "self-extinguishing" compositions are known in the art. The use of 1,2,3,4,5-pentabromo-6-chlorocyclohexane, tetrabromophthalic anhydride and antimony trioxide are known as flame retarding additives when used individually, as taught respectively in U.S. Pats. 3,379,656 and 3,333,970 and In re Spatz and Koral, 156 USPQ 39. By "self-extinguishing" or "flame retarding" it is meant that the material is incapable of burning or sustaining a flame for more than a short time after it is separated from an open flame in which it has been heated and ignited.

It has recently been discovered that certain combinations of the above materials when mixed together act very unexpectedly and synergistically when intimately incorporated into a normally flammable polypropylene material rendering this flammable polypropylene material self-extinguishing. The concentration of the above flame retarding compounds when used individually require approximately 20 to 35% by weight, based on the total weight of the polypropylene to be flame retarded, to render the polypropylene self-extinguishing. However, it has unexpectedly been discovered that in combination 1,2,3,4,5-pentabromo-6-chlorocyclohexane, tetrabromophthalic anhydride and antimony trioxide have a significant synergistic effect on rendering normally flammable polypropylene materials self-extinguishing when used in combined amounts as low as from about 1 to 12% by weight, based on the total weight of the polypropylene material to be flame retarded.

There are four serious problems which occur when large amounts of the above known flame retarding materials are used in synthetic textiles, especially in polypropylene. First, when large amounts of the above flame retardant materials are used in the range of 30 parts per 100 parts by weight of the polypropylene the tensile strength of filaments made from the polypropylene is reduced from approximately 6,000 p.s.i. to 2,000 p.s.i., which is an unacceptable reduction in tensile strength. Secondly, "spew out" occurs when large amounts of the flame retarding material migrates to the surface of polypropylene textile. If the flame retarding materials are in powder form then the "spew out" will normally appear as a powder on the surface of the textile. If the flame retarding material is a liquid then "spew out" will appear on the surface of the textile as an oily material. This condition is unacceptable in synthetic textiles. Thirdly, when large amounts of a flame retardant material or composition are used in clear synthetic polypropylene based textiles, the color of the textile is changed so that only light colors, such as pastels or clear textiles, can be obtained by dyeing or pigmenting. Fourthly, when large amounts of the flame retarding materials are added to the textile polymer, this high loading can clog the screen packs in the textile fiber extrusion equipment making long extrusion runs difficult and in most cases impossible. Therefore, when only one of the flame retarding compounds of this invention is used alone, large amounts of the flame retardant are required to render the normally flammable polypropylene material self-extinguishing, the above undesirable properties occur.

When the flame retarding composition of this invention was used with polypropylene there were several very desirable unexpected results. One, the total amount of flame retardant material necessary to render polypropylene self-extinguishing dropped from approximately 20 to 35 parts per 100 parts of the material to be flame retarded for each of the individual flame retarding ingredients to approximately 1 to 12 parts per 100 parts of the material to be flame retarded for the combination of ingredients to impart the same self-extinguishing properties. Two, "spew out" which is very prevalent, when 1,2,3,4,5-pentabromo-6-chlorocyclohexane is used alone was greatly decreased, and in most cases eliminated altogether by the use of the tetrabromophthalic anhydride. Three, the tensile strength of the polypropylene textile was not effected by the addition of the flame retardant composition of this invention since only a small amount of the flame retardant composition was necessary to be completely effective. However, when each ingredient was used individually in amounts necessary to flame retard the textile, the tensile strength was lowered to an unacceptable degree.

The applicant conducted many experiments before discovering the present invention. The first of a series of these experiments was the use of 1,2,3,4,5-pentabromo-6-chlorocyclohexane alone in polypropylene as a flame retarding ingredient. It required approximately 27 to 30 parts by weight of this flame retardant per 100 parts of polypropylene to render polypropylene self-extinguishing. Another compound solid under the trade name Victamide by Stauffer Chemical Co., was used in an attempt to render polypropylene self-extinguishing. Victamide is an ammonium salt of an amido polyphosphate formed by a gas phase reaction of $P_2O_5$ and $NH_3$. When Victamide was used alone, as much as 50 parts of Victamide were added to 100 parts of polypropylene resulting in no appreciable effect upon the flammable characteristics of polypropylene. However, unexpectedly when a composition was prepared consisting of from about 50 to 70% by weight of 1,2,3,4,5-pentabromo-6-chlorocyclohexane preferably 55 to 65% and from about 30 to 50% by weight, preferably 35 to 45% of Victamide a synergistic flame retarding composition resulted. This composition rendered polypropylene self-extinguishing when used in amounts of from about 6 to 20% by weight per 100 parts of polypropylene. However, many problems arose in the use of this composition. These problems were especially prevalent when this flame retardant was used in polypropylene. This 1,2,3,4,5-pentabromo-6-chlorocyclohexane tended to "spew out" at concentrations as low as 3 parts per 100 parts of polypropylene. In addition, Victamide caused troubles by tending to plate out of the polypropylene onto the polypropylene textile processing equipment. Therefore, these problems prevented the use of this flame retardant composition in polypropylene which was to be used particularly in the manufacture of carpet backings.

Several other compounds were used individually in polypropylene. It was found that a mixture of 22 parts by weight of ethylene-bis[tris(2 - cyanoethyl)-phosphonium bromide], sold under the trade name RF–1 by American Cyanamid Co., in 100 parts of polypropylene rendered polypropylene self-extinguishing and that a mixture of 12 parts tris(2,3-dibromopropyl) phosphate, sold under the trade name T23P by Michigan Chemical Co., in 100 parts polypropylene rendered polypropylene self-extinguishing. Further experiments revealed that 11 parts by weight of a mixture of tris(2,3-dibromopropyl) phosphate and ethylene-bis[tris(2-cyanoethyl)-phosphonium bromide] in 100 parts of polypropylene rendered polypropylene self-extinguishing. However, most unexpected when a composition was prepared consisting of from about 40 to 80% preferably 55 to 65% by weight of tris(2,3-dibromopropyl) phosphate, 5 to 25% preferably 10 to 20% by weight of ethylene - bis[tris(2 - cyanoethyl)-phosphonium bromide], 5 to 25% preferably 10 to 20% by weight of 1,2,3,4,5-pentabromo-6-chlorocyclohexane, and 1 to 20% preferably 5 to 15% by weight of Victamide a significant synergistic flame retardant composition resulted. This composition rendered normally flammable polypropylene self-extinguishing when the composition was added to the polypropylene in amounts as small as 8 parts by weight of the flame retardant per 100 parts of polypropylene. However, many problems also arose in the use of this composition. "Spew out" continued to be a serious problem. Also the Victamide continued to plate out on the textile manufacturing equipment. The tris(2,3 - dibromopropyl) phosphate, which was in liquid form, also caused "spewing" and as a result the textiles made from the self-extinguishing polypropylene had an undesirable oily residue on their surfaces. Another problem with this composition was one of dispersion. All the ingredients were solids except the tris(2,3-dibromopropyl) phosphate which was a liquid. Therefore, the solids had to be dispersed into the liquid which was then dispersed in molten polypropylene. This polypropylene composition was then heated and extruded through fiber or filament forming dies called spinnerets. If a fiber or filament is being extruded which is made from polypropylene containing a poorly dispersed flame retardant then a filament may be extruded than contains only the flame retardant for several feet of the filament and very little polypropylene. This is a very undesirable situation since the tensile strength of the filament at this point is very low compared to the tensile strength of polypropylene containing the proper amount of the flame retardants. These filaments containing poorly dispersed flame retardants break very easily and result in time loss from having to stop the textile manufacturing equipment in order to reconnect and re-align these broken filaments. Therefore, further experimentation was undertaken which resulted in the discovery of the present invention.

SUMMARY OF THE INVENTION

The invention relates to a flame retarding synergistically-acting composition of 1,2,3,4,5 - pentabromo-6-chlorocyclohexane, tetrabromophthalic anhydride and antimony trioxide which renders a self-extinguishing property to normally flammable polypropylene materials.

Particularly, in the invention, the flame retarding composition is utilized to render polypropylene, particularly as used in carpet backings, flame retardant or self-extinguishing.

Very unexpectedly the composition of the present invention exhibited almost no synergistic effect when utilized with other polyolefins, such as polyethylene, or with polyurethanes, polysulfide, or acrylic rubbers. There was a flame retarding action caused by the inventive composition, but it was not as good as it was for polypropylene. This result was surprising in that the known flame retardants of this invention with a known synergist, antimony trioxide, were found to not work synergistically for other polymeric fibers.

Accordingly, this specific composition exhibits its synergistic performance particularly when incorporated in a polypropylene system, especially polypropylene fibrous materials.

A need arose for a flame retarding composition which could easily be incorporated into the flammable polypropylene materials to render them self-extinguishing. However, a problem arose in many of the compositions using known flame retarding materials since a high percentage of flame retarding material is necessary in order to render self-extinguishing properties to the normally flammable materials. The high concentration of the flame retarding compounds has a great degradation effect on synthetic or man-made textiles particularly and especially polypropylene. When a high amount of the flame retarding compounds are added to the polypropylene, it loses a great deal of its tensile strength when it is subsequently extruded into fibers or filaments. Also, the polypropylene tends to discolor when large amounts of the known flame retardants are added. Therefore, a need arose for a flame retardant composition that could be added in very small amounts and still render normally flammable polypropylene materials self-extinguishing without adversely changing the physical properties of the flammable polypropylene materials. The individual compounds used in this invention when used alone as flame retardants require up to 20 to 35% by weight, based upon the total weight of the flammable polypropylene material, to render these flammable materials, self-extinguishing. However, unexpectedly it was found that when these flame retarding materials were combined a significant synergistic self-extinguishing effect was obtained when the composition was used on a polypropylene material. As a result of this synergistic effect the amount of material necessary to render normally flammable polypropylene materials, self-extinguishing, dropped from 20 to 35% by weight based upon the total weight of the polypropylene to from about 1 to 12% by weight, based upon the total weight of the polypropylene to be flame retarded.

A further most unexpected result occurred when the tetrabromophthalic anhydride was used with the 1,2,3,4,5-pentabromo-6-chlorocyclohexane and antimony trioxide since 1,2,3,4,5 - pentabromo-6-chlorocyclohexane causes severe "spew out" in polypropylene. When the tetrabromophthalic anhydride was added "spew out" was significantly reduced and in most cases eliminated completely. Only slight "spewing" was observed when amounts as high as 16 parts by weight of the flame retardant composition of this invention was incorporated into 100 parts of polypropylene.

BRIEF DESCRIPTION OF THE DRAWINGS

FIG. 1 illustrates graphically the burn-test results as shown in Examples 12–37. The seconds required, for normally flammable polypropylene to be self-extinguishing are graphed against the amount of flame retarding material of this invention necessary to impart self-extinguishing properties to the polypropylene. This graph clearly illustrates that concentrations as low as approximately 3 parts by weight of the flame retardant composition of this invention per 100 parts of polypropylene imparts significant self-extinguishing properties to polypropylene. In addition, at the bottom of FIG. 1 "spew out" is shown in relationship to the parts by weight of the flame retardant per 100 parts of polypropylene. At 3 parts by weight of the flame retardant composition no "spewing" was observed and only slight "spewing" was observed when as much as 16 parts of the flame retardant was used. Therefore, this graph illustrates that the composition of this invention not only flame retards polypropylene when used in very low concentrations but also prevents "spew out" from occurring when even larger amounts of the flame retardant was used than was normally required to flame retard polypropylene.

FIG. 2 illustrates graphically the spewing-ratings as shown in Examples 44–59. The spew ratings are graphed against varying amounts of the flame retarding composition of this invention. This graph clearly shows that the applicant's invention most unexpectedly retards "spew out" by the use of tetrabromophthalic anhydride with 1,2,3,4,5 - pentabromo-6-chlorocyclohexane which causes severe "spew out" in polypropylene. It shows that only slight "spewing" was observed when as much as 16 parts of the flame retardant composition of this invention was used in 100 parts of polypropylene.

DESCRIPTION OF THE PREFERRED EMBODIMENTS

Figure 1:
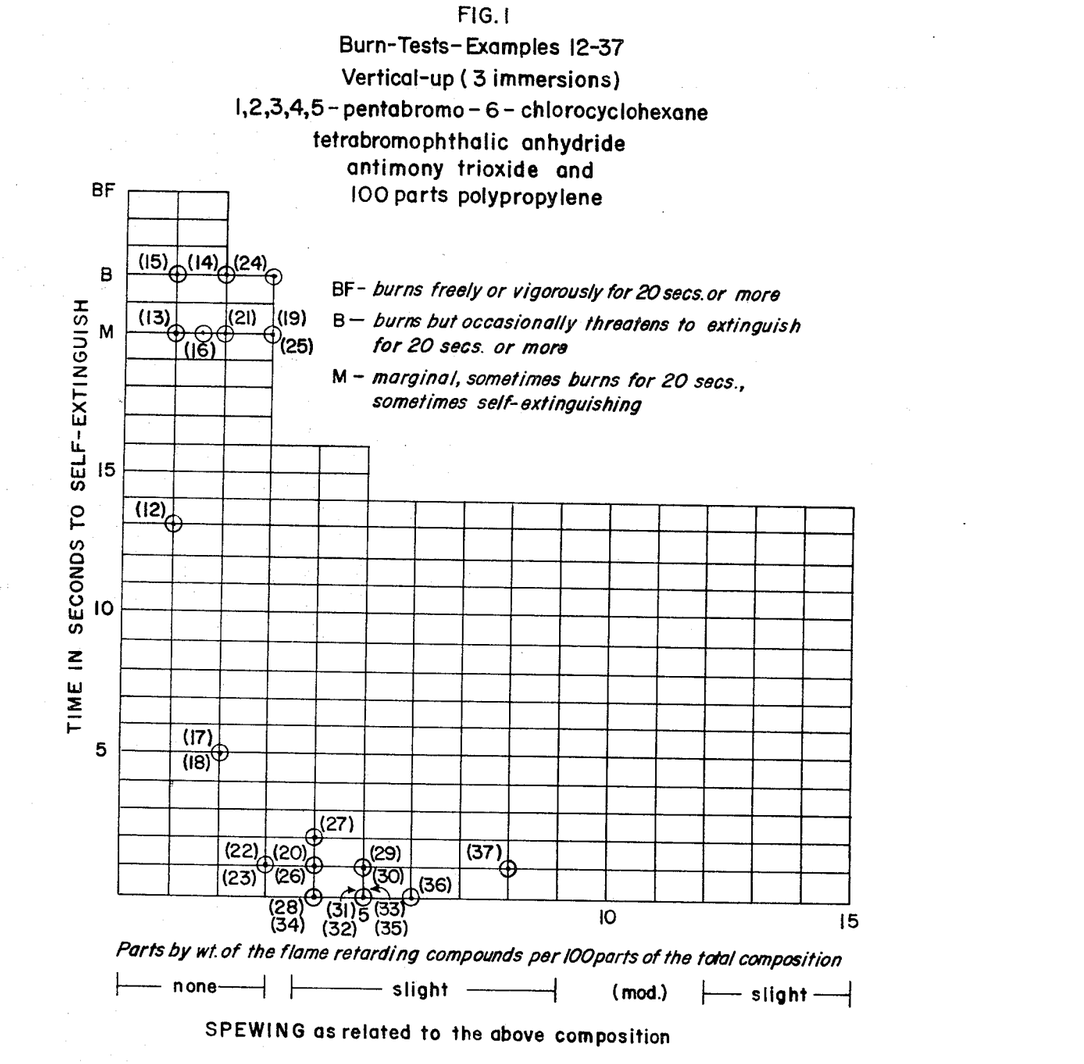
Figure 2:
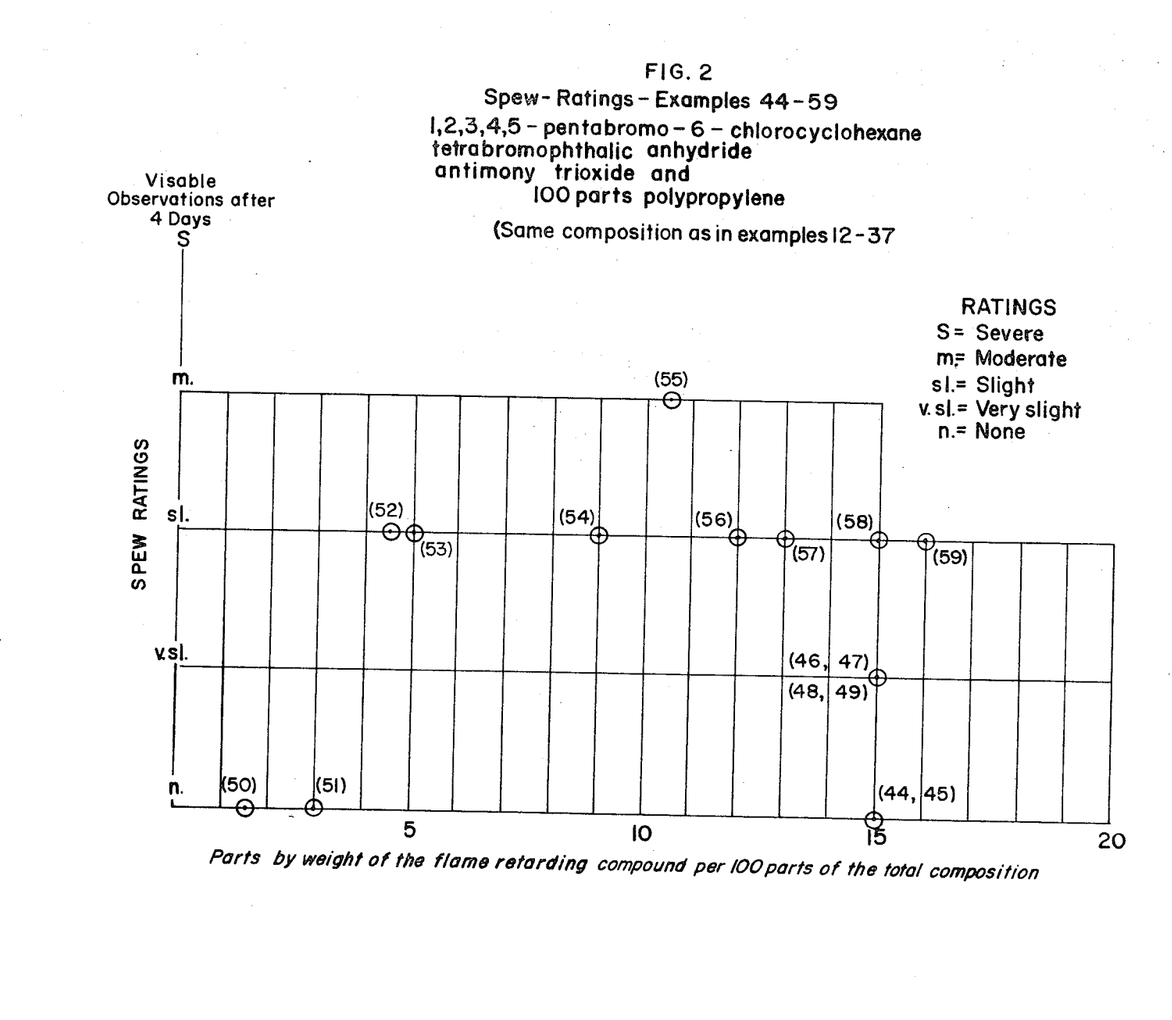

The flame retardant composition for rendering normally flammable polypropylene materials self-extinguishing consists of from about 20 to 60% by weight of 1,2,3,4,5-pentabromo-6-chlorocyclohexane based on the total weight of the flame retarding composition, preferably from about 30 to 40% by weight, more preferably, from about 32 to 34% by weight; and from about 30 to 70% by weight of tetrabromophthalic anhydride based on the total weight of the flame retarding composition, preferably 50 to 60% by weight, more preferably 54 to 56% by weight; and from about 1 to 30% by weight of antimony trioxide based on the total weight of the flame retarding composition, preferably 9 to 13% by weight, more preferably 10 to 12% by weight.

By polypropylene textiles it is meant any flexible product or article of manufacture (by itself or in combination with other products or materials) formed in whole or in part by extrusion, spinning, shaping, foaming, splitting of films, fibrillating or otherwise processing of a polypropylene or polypropylene composition resin in an elongated or continuous or discontinuous or non-textured or textured form including (but not limited to) strands, filaments (mono and multi-), ropes, threads, cables, twine, tapes, ribbons, weaving and tufting yarns (backing, face and pile), shrinkable yarns, belting, woven fabrics, knitted fabrics, non-woven fabrics including spunbonded, wet-adhesive bonded, foam-flame bonded, laminated, felted, needle-punch, and fiberwoven fabrics, and the like; and by altering the properties of the products by compounding the polypropylene or polypropylene composition resin with modifying ingredients.

The term fiber as used in describing the invention includes and is intended to include filaments of round, rectangular, oval, or other known cross-sectional forms, whether the fiber is in continuous or discontinuous, e.g. chopped, fibrous form. The term yarn likewise includes and is intended to include textured and non-textured yarns.

Polypropylene compositions used to practicing the invention are known compositions and are taught, for example, in U.S. Pat. 3,433,853. The use of polypropylene filaments in ribbon or tape form inter-woven to make a fabric which can be used as a backing material to which face yarn can be tufted to make a tufted carpet, has become a widely practiced art and is especially preferred in this invention. Tufted pile fabric, comprising such a flat woven synthetic plastic backing, is taught for example, by T. M. Rhodes, U.S. Pat. 3,110,905. The synthetic materials used in making the backing and the face yarns are normally colorless or light beige colored material. Therefore, dying of the materials ordinarily must be done to manufacture an attractive carpet. For example, the backing can be prepared from a ribbon filament which is colored by subjecting the backing to a dye bath. However, the use of the known flame retardant compositions, in amounts presently required to render the normally flammable carpet backing self-extinguishing, discolors the polypropylene to such an extent, that clear or pastel colors are not possible because of this discoloration. However, with the practice of the present invention, due to the low concentration of the flame retardant materials necessary, no adverse effects are noticed in the clear or light pastel colored carpet backings.

Particularly, in the invention, the self-extinguishing textile composition for rendering normally flammable polypropylene textiles self-extinguishing consists of from 85 to 99% by weight of the textile polymer based on the total weight of the composition, preferably 90 to 98% by weight; and from about 0.1 to 10% by weight of 1,2,3,4,5-pentabromo-6-chlorocyclohexane based on the total weight of the composition, preferably 1 to 6% by weight; and from 0.1 to 10% by weight of tetrabromophthalic anhydride based on the total weight of the composition, preferably 1 to 5% by weight; and from about 0.05 to 5% by weight of antimony trioxide based on the total weight of the composition, preferably 0.1 to 2% by weight.

It would normally be expected that this synergistic flame retardant composition which yields superior results when applied to a polypropylene material would be equally as effective on other polymeric materials, especially other polyolefins. However, this has not been found. While the composition acts as a flame retardant for other polymeric materials, no evidence of the pronounced synergistic effect was observed. See Examples 80–87.

In the flame retardant composition the ingredients are simply stirred or mixed to homogenize the composition. This composition can then be incorporated into any fluid mixture of a normally flammable material which is curable and upon curing the material it will be self-extinguishing. In the self-extinguishing polypropylene textile composition for rendering normally flammable polypropylene textiles self-extinguishing the ingredients are simply stirred or mixed to homogenize the composition with the polypropylene polymer composition. Thereafter the composition is heated to a temperature necessary to melt the polymeric material from which fibers or filaments may be extruded. These filaments or fibers may be used, for example, in making carpet backings, face yarns for carpets, materials for draperies or for shading crops, or woven into upholstery for use, for example, as automobile upholstery.

Particularly, in the invention, the polypropylene composition useful in preparing the filament ribbon from which the carpet backing can be woven, can be 100% regular or isotactic polyolefin or from about 80 to 99.5% by weight of a stereo regular or isotactic polyolefin and 0.5 to 20% by weight of a basic polyamide comprising the reaction product of an aliphatic dicarboxylic acid or derivative thereof and a polyamine containing not more than two primary amino groups and one or more tertiary amino groups, and wherein said basic polyamide is present in an amount sufficient to provide 0.1 to 1.0% by weight of basic nitrogen in the composition and said basic polyamide has a crystallite melting point in the range 50–250° C. Preferably, the polyamine is one derived by reacting methyl bis(3-aminopropyl) amine and hexamethylenediamine. Also, preferably the polyolefin is selected from linear polyethylene, stereoregular poly-(4-methyl-pentene-1) and isotactic polypropylene.

Face yarns are usually derived from synthetic polymers, for example, polyamides and polyesters. The basic polyamides which can be used in practicing the present invention are taught in U.S. 3,433,853 and is incorporated by reference into the present invention as materials useful in the practice of the present invention. The basic polyamides, according to this invention, are condensation polymers which are substantially insoluble in water and which have a crystallite melting point (measured using a Fisher-Johns melting point apparatus) of from about 50° C. to about 250° C.

The nylon yarn which can be used in this invention may be nylon 66, a polyamide fiber-forming substance whose chemical composition is hexamethylene adipamide. Nylon type 846, sold under the trademark Dupont, is especially preferred. However, any long chain synthetic polyamide having recurring amide groups as an integral part of the polymer chain can be used. Suitable nylon fibers in yarn form for use in the practice of the invention may be selected from those described in "Guidebook to Man-Made Textile Fibers and Textured Yarns of the World" Adeline A. Demback, The United Piece Dye Works, New York, N.Y., 3rd edition, pages 136–158, incorporated herein by reference.

The polyester yarns which can be used in the invention may be made of a fiber of any long chain synthetic polymer composed of at least 85% by weight of an ester of a dihydric alcohol and terephthalic acid, Suitable polyesters for use in practicing this invention also may be selected from the "Guidebook," supra, pages 172–186 of which are also incorporated herein by reference.

A preferred polyester fiber-forming substance is polyethylene terephthalate fiber, although others may be employed, more specifically those in which the recurring unit in the polyester chain is the diacyl aromatic radical from terephthalic acid, isophthalic acid, 5-t-butylisophthalate, or naphthalene dicarboxylic acids, such as naphthalene-2,6- and naphthalene-2, 7-dicarboxylic acids.

In order to point out more fully the invention in its practical aspects, the following non-limiting illustrative examples are given of the practice of the invention. The invention is further illustrated by means of a representative, commercially available polyolefin as taught, for example, in U.S. Pat. 3,433,853.

The invention is illustrated with synthetic or manmade textile polymers. However, it is to be understood the invention may be practiced with other normally flammable materials.

The flame retardant composition itself consists of a mixture of 1,2,3,4,5-pentabromo - 6 - chlorocyclohexane, tetrabromophthalic anhydride and antimony trioxide. These compounds are commercially available.

EXAMPLES 1–37

There are many tests available to determine flammability or self-extinguishing properties of various materials. However, most of the tests require expensive and extensive testing equipment. Furthermore, the relationship of these tests results to actual burning conditions is somewhat dubious. Flammability, as generally recognized, is a complex phenomenon and no one test has been determined to completely describe or record it. Therefore, the following test procedures were devised to show the relative self-extinguishing properties of the polypropylene materials when admixed with various flame retardants as shown in the Burn Rating Examples 1 through 37.

The flame retardant composition of the present invention was homogeneously mixed into the polypropylene material to be rendered self-extinguishing. This material, before curing, was pressed out into 40 mil thick sheets, in order that, strips ¼" x 6" x 40 mils could be cut from these pressouts. The samples, were then placed in a laboratory hood for testing. The hood fan was turned on and the hood window was raised 21" from the bench top. A uniform draft rate resulted. A bunsen burner was placed 14 inches from the edge of the hood bench.

The material was first tested in positions over the flame, after which, the time required for the material to self-extinguish was recorded. The four positions were (1) a vertical upward position. The flame was placed directly under the material. This was the most severe test of the first 4 tests since the flame migrates upwards along the strip decomposing the flame retarding composition in advance of the flame so that the flame in some cases was feeding itself upon unprotected material as it burned upward. The second position (2) was a 45° angle upward position. The flame was placed at a 45° angle to the material. This was a less severe burning position. The third position (3) was a horizontal position. The flame was placed horizontal with the material. This was a less severe burning position. The fourth position (4) was a vertically downward position. The flame was placed directly over the material. This was the least severe of the four burning test positions.

The sample material was tested in the above four test positions by first placing the above mentioned ¼" x 6" 40 mil strip into the flame in the vertical downward position for 5 seconds, then out of the flame observing how long the material burned. The test results were recorded. This same procedure was followed in the horizontal, 45° angle upward and vertically upward positions. As the burn positions got more severe the self-extinguishing properties of the different materials, using different flame retarding ingredients, were recorded. When a material was found to be self-extinguishing in 1 second or less in all of the above burn positions when it was removed from the flame, *a fifth and more severe test was applied*. This test consisted of using the most severe burning position, the vertical upward position. The material to be tested was placed into the flame 3 times at 5 seconds intervals with 5 seconds intervals out of the flame between immersions. If the material self-extinguished in 1 second or less when removed from the flame it was considered adequately flame retarded. These test results were recorded in Table I.

The following burn test ratings were used. BF (burns freely) was used to designate that the material burned freely or vigorously for 20 seconds or more after it was removed from the flame. B (burns) was used to designate that the material burned for 20 seconds or more but threatened to self-extinguish. M (marginal) was used to designate that the material burned sometimes for 20 seconds and then self-extinguish. When the material self-extinguish in less than 20 seconds then the *time in seconds*, after the material was removed from the flame to self-extinguish, was recorded. The average of five tests were taken. However, if any of the five test results differed more than five seconds then seven determinations were made and the high and low numbers were dropped.

EXAMPLES 38–75

Examples 38 through 75 represent "spew out" tests conducted on polypropylene. By "spew out" it is simply meant that the flame retarding composition is not accepted by the plastic or material to be flame retarded. Materials like polypropylene do not accept fillers readily. Therefore, many of the flame retardants known in the art cause "spew out," especially 1,2,3,4,5-pentabromo-6-chlorocyclohexane which requires up to 27 parts per 100 parts of polypropylene to be an effective flame retardant. This "spew out" deposition, when the flame retardant is in powder form, appears as a chalky deposit on the surface of the material being flame retarded. This is very undesirable for a number of reasons, especially in synthetic textiles where the fibers are being extruded through a screen pack where the "spewed out" particles lodge in the screen and cause equipment failure until these deposits are removed. The screen pack is at the head of the worm gear of the extruder and it filters out any foreign materials from the textile polymer to be extruded into ribbons or fibers etc. This "spew out" fills up the screen pack quite rapidly resulting in the whole operation having to be stopped until the screen pack can be cleaned. When the flame retarding material is a liquid, "spew out" will appear as an oily substance on the surface of the material being flame retarded. This, of course, is a most undesirable condition in most all materials, especially textiles.

The "spew out" test procedures used to obtain the results as recorded in Table II were conducted by pressing out sheets of the material to be tested, which contained the flame retarding ingredients. These sheets, measuring 6" x 6", were prepared using a standard type, F. S. Carver, press. Any similar type press may be used. After the sheets of material were prepared, the test was conducted simply by making an "X" mark with a finger on the surface of the sheets of material at specific time intervals and the amount of powder accumulated on the surface of the material and the finger was recorded, if a flame retardant in powder form was being used, or the amount of the oily substance was recorded, if a liquid flame retardant was being used.

In Examples 38 through 75 an "X" mark was made by running a finger over the surface of a 6" x 6" sheet of the textile material. After this step, the sheet was held up at various angles to the light and the amount of deposition remaining on the surface of the 6" x 6" sheet was recorded. Also, the finger which made the "X" mark was examined to determine if it contained any accumulation of the material.

The following test results were used to record the amount of spew-out. None was used to designate there was no trace of an "X" mark on the surface of the material after making an "X" mark with the finger and no trace of any accumulation of "spew out" on the finger itself. Very slightly was used to designate there was no trace of an "X" mark on the surface of the material and only a very slight accumulation of the white spew-out powder on the finger. Slight was used to designate there was no trace of an "X" mark on the surface of the material. However, there was definitely a noticeable slight accumulation of white spew-out powder on the finger. Moderate (Mod.) was used to designate that after an "X" mark had been made by the finger on the surface of the material there was barely visible on the surface this "X" mark when the material was held at various angles to a light source. Also, there was a moderate accumulation of white spew-out powder on the finger. Severe was used to designate that there was an "X" mark readily apparent on the surface of the material after making the "X" mark when the material was held at various angles to a light source. Also, there was a pronounced accumulation of spew-out powder on the finger. As mentioned above, if "spew out" is severe not only can the person conducting the test see the "X" mark on the sheet of material but the tester will get a large deposition of white powder or oily "spew out" material on his or her finger.

Examples 38 through 75 illustrate that 1,2,3,4,5-pentabromo-6-chlorocyclohexane causes severe "spew out." This condition increases as temperature and mixing times increase. However, most unexpectedly by adding the tetrabromophthalic anhydride in certain proportions the "spew out" caused by the 1,2,3,4,5 - pentabromo-6-chlorocyclohexane was controlled to acceptable limits and completely eliminated in most cases. Also, at this low concentration tetrabromophthalic anhydride combined with antimony trioxide alone caused no "spew out" at all.

Table II illustrates this synergistic and most unexpected results of retarding "spew out" by the use of tetrabromophthalic anhydride with 1,2,3,4,5-pentabromo-6-chlorocyclohexane which causes "spew out."

Table III illustrates Examples 2–4 graphically showing the relationship of the seconds required for polypropylene, containing varying amounts of 1,2,3,4,5-pentabromo-6-chlorocyclohexane per 100 parts of the polypropylene, to self-extinguish.

This table clearly shows that amounts of between 25 and 27 parts of 1,2,3,4,5 - pentabromo - 6 - chlorocyclohexane per 100 parts of polypropylene was required to impart flame retarding properties to polypropylene.

Table IV illustrates Examples 5–11 graphically showing the relationship of the seconds required for polypropylene, containing varying amounts of both tetrabromophthalic anhydride and antimony trioxide per 100 parts of the polypropylene, to self-extinguish.

This table clearly shows that approximately 20 parts of the composition containing both tetrabromophthalic anhydride and antimony trioxide per 100 parts of polypropylene was required to meet our self-extinguishing requirement which in its final form is the fifth test, the vertical-upward (3 immersions) self-extinguishing test described previously.

Table V illustrates Examples 61–69 graphically showing the relationship of "spewing" in polypropylene containing varying amounts of 1,2,3,4,5 - pentabromo - 6-chlorocyclohexane per 100 parts of the polypropylene.

This table clearly shows that 1,2,3,4,5-pentabromo-6-chlorocyclohexane caused very slight "spewing" up to 1.5 parts per 100 parts of polypropylene but caused moderate to sever "spewing" above 2 parts per 100 parts of polypropylene.

Table VI illustrates Examples 70–75 graphically showing the relationship of "spewing" in polypropylene containing both tetrabromophthalic anhydride and antimony trioxide per 100 parts of the polypropylene.

This table shows that when a composition containing tetrabromophthalic anhydride and antimony trioxide was introduced in amounts up to 12 parts per 100 parts of polypropylene no spewing occurred in the polypropylene.

Examples 76–79 illustrate the use of the flame retardant composition of this invention in various other normally flammable materials.

TABLE II

| Example number | 38 | 39 | 40 | 41 | 42 | 43 | 44 | 45 | 46 | 47 | 48 | 49 |
|---|---|---|---|---|---|---|---|---|---|---|---|---|
| 1,2,3,4,5-pentabromo-6-chlorocyclohexane (Dow NC-1080) | 4.0 | 4.0 | 4.0 | 4.0 | 4.0 | 4.0 | 5.0 | 5.0 | 5.0 | 5.0 | 5.0 | 5.0 |
| Tetrabromophthalic anhydride | | | | | | | 8.3 | 8.3 | 8.3 | 8.3 | 8.3 | 8.3 |
| Antimony trioxide | | | | | | 1.7 | 1.7 | 1.7 | 1.7 | 1.7 | 1.7 | 1.7 |
| Polypropylene | 100.0 | 100.0 | 100.0 | 100.0 | 100.0 | 100.0 | 100.0 | 100.0 | 100.0 | 100.0 | 100.0 | 100.0 |
| Mixing time, minutes | 3 | 5 | 10 | 3 | 5 | 10 | 3 | 5 | 10 | 3 | 5 | 10 |
| Mixing temperature, °C | 180 | 180 | 180 | 200 | 200 | 200 | 180 | 180 | 180 | 200 | 200 | 200 |
| Spew rating:[1] | | | | | | | | | | | | |
| 1 day | None | Moderate | Severe | Severe | Severe | Severe | None | Very slight | Very slight | Very slight | Very slight | Very slight |
| 4 days | Moderate | do | do | do | do | do | None | None | do | do | do | Do |

Burn ratings

| Example number | 50 | 51 | 52 | 53 | 54 | 55 | 56 | 57 | 58 | 59 | 60 | 61 | 62 |
|---|---|---|---|---|---|---|---|---|---|---|---|---|---|
| 1,2,3,4,5-pentabromo-6-chlorocyclohexane (Dow NC-1080) | 0.75 | 1.5 | 2.25 | 3 | 4.5 | 5.25 | 6.0 | 6.75 | 7.5 | 8.25 | 0.5 | 1.0 | 1.5 |
| Tetrabromophthalic anhydride | 0.62 | 1.2 | 1.90 | 2.5 | 3.7 | 4.3 | 5.0 | 5.6 | 6.2 | 6.87 | | | |
| Antimony trioxide | 0.12 | 0.3 | 0.35 | 0.5 | 0.8 | 0.95 | 1.0 | 1.15 | 1.3 | 1.38 | | | |
| Polypropylene | 100.0 | 100.0 | 100.0 | 100.0 | 100.0 | 100.0 | 100.0 | 100.0 | 100.0 | 100.0 | 100.0 | 100.0 | 100.0 |
| Spew rating: | | | | | | | | | | | | | |
| 1 day | None | None | V. slight | Slight | Slight | Moderate | Slight | Slight | Slight | Slight | | | |
| 4 days | do | do | Slight | do | do | do | do | do | do | do | | | |

Spew rating

| Example number | 63 | 64 | 65 | 66 | 67 | 68 | 69 | 70 | 71 | 72 | 73 | 74 | 75 |
|---|---|---|---|---|---|---|---|---|---|---|---|---|---|
| 1,2,3,4,5-pentabromo-6-chlorocyclohexane (Dow NC-1080) | 2.0 | 2.5 | 3.0 | 4.0 | 6.0 | 8.0 | 10.0 | | | | | | |
| Tetrabromophthalic anhydride | | | | | | | | 0.83 | 1.6 | 3.3 | 6.7 | 8.3 | 10.0 |
| Antimony trioxide | | | | | | | | 0.17 | 0.4 | 0.7 | 1.3 | 1.7 | 2.0 |
| Polypropylene | 100.0 | 100.0 | 100.0 | 100.0 | 100.0 | 100.0 | 100.0 | 100.0 | 100.0 | 100.0 | 100.0 | 100.0 | 100.0 |
| Spew rating:[2] | | | | | | | | | | | | | |
| 1 day | Moderate | Moderate | Moderate | Moderate | Slight | Slight | Slight | None | None | None | None | None | None |
| 4 days | do | Severe | Severe | Severe | Moderate | Moderate | Moderate | do | do | do | do | do | Do |

[1] Visible observation after "X" shaped finger wipe on surface and powder accumulation on finger after wipe.
[2] 5 minute mixing at 180° C.

Note.—None=No trace of "X" on surface and no trace of accumulations on finger after wiping; Very slight=No trace of "X" on surface. However, very slight powder on finger barely noticeable; Slight=No trace of "X" on surface. However, slight powder accumulation on finger (definitely noticeable); Moderate=Can barely see the "X" mark on the surface at various angles to light source. However, moderate powder accumulation on finger; Severe="X" marking on surface is readily apparent. Also, there is a pronounced powder accumulation on finger.

TABLE III
Burn-Tests-Examples 2-4
Vertical-up(3-immersions)
1,2,3,4,5-pentabromo-6-chlorocyclohexane
and
100 parts polypropylene BF- burns freely or vigorously for 20 secs. or more
B- burns but occasionally threatens to extinguish for 20 secs. or more
M- marginal, sometimes burns for 20 seconds, sometimes self-extinguishing Parts by weight of the flame retarding compound per 100 parts of the total composition TABLE IV
Burn-Tests-Examples 5-11
Vertical-up (3 immersions)
tetrabromophthalic anhydride
antimony trioxide and
100 parts polypropylene BF- burns freely or vigorously for 20 secs. or more
B- burns but occasionally threatens to extinguish for 20 secs. or more
M- marginal, sometimes burns for 20 seconds, sometimes self-extinguishing Parts by weight of the flame retarding compounds per 100 parts of the total composition

TABLE V

Spew-Ratings- Examples - 38-43 and 60-69

1,2,3,4,5 - pentabromo-6-chlorocyclohexane
and
100 parts polypropylene (Same Composition as in Examples 2-4)

Parts by weight of the flame retarding compound per 100 parts of the total composition

TABLE VI

Spew-Ratings-Examples 70-75 tetrabromophthalic anhydride
antimony trioxide and
100 parts polypropylene (Same composition as in Examples 5-11)

Parts by weight of the flame retarding compound per 100 parts of the total composition

EXAMPLE 76

A basic polyamide containing tertiary amine groups and the flame retarding composition of this invention is as follows:

| | |
|---|---|
| Azelaic acid _______________________moles__ | 1.50 |
| Hexamethylenediamine (60% aqueous) __do____ | 0.7875 |
| N,N' - bis - (3 - aminopropyl) methyl amine ______________________________do____ | 0.7875 |
| 1,2,3,4,5 - pentabromo - 6 - chlorocyclohexane (Dow NC–1080) _______________percent [1]__ | 1.5 |
| Tetrabromophthalic anhydride ________do.[1]____ | 1.2 |
| Antimony trioxide __________________do.[1]____ | 0.3 |

[1] Percentage of the total weight of the composition.

This azelaic acid is placed into a 500-ml. resin kettle equipped with a stainless steel stirrer, take-off condenser, nitrogen inlet, thermometer and addition funnel. The amines are added conjugately to the acid melt (115° C.) with stirring in an atmosphere of nitrogen. The amine addition should take from 20 to 30 minutes. When the amines are added, the temperature is raised to 175° C. for 2 hours. Finally, a vacuum (50 mm. Hg) is applied for 30 minutes. This product is then mixed with 1.5%, 1,2,3,4,5 - pentabromo - 6 - chlorocyclohexane based on the total weight of the composition, 1.2%, tetrabromophthalic anhydride based on the total weight of the composition and 0.3%, antimony trioxide based on the total weight of the composition. This product is quickly poured into an aluminum pan and allowed to cool in a desiccator over $CaSO_4$; in a nitrogen atmosphere. The resulting product should be white in color and should have a melting point range of 163° C. to 167° C. and a relative viscosity (2% solution in 90% formic acid at 25° C.) of 1.64. The resulting product should have excellent self-extinguishing textile polymer which can be extruded into filaments for making a self-extinguishing textile.

EXAMPLE 77

A basic self-extinguishing polyamide containing secondary amine groups is prepared from the following ingredients:

| | |
|---|---|
| Sebacic acid ____________________________ | 1.50 |
| Hexamethylenediamine (60% aqueous) _______ | 0.7875 |
| Diethylene triamine _____________________ | 0.7875 |
| 1,2,3,4,5 - pentabromo - 6 - chlorocyclohexane (Dow NC–1080) _______________percent [1]__ | 1.5 |
| Tetrabromophthalic anhydride ________do.[1]____ | 1.2 |
| Antimony trioxide __________________do.[1]____ | 0.3 |

[1] Percentage of the total weight of the composition.

The product should have a viscosity (2% solution in 90% formic acid at 25° C.) of 1.8 to 1.9.

The resulting product should have excellent self-extinguishing textile polymer which can be extruded into filaments for making a self-extinguishing textile.

EXAMPLE 78

Polyamides, prepared as in Example 77, are mixed with isotactic polypropylene (polyamide, 7.5 parts; polypropylene, 92.5 parts), 1.5% 1,2,3,4,5 - pentabromo-6-chlorocyclohexane based on the total weight of the composition, 1.2% tetrabromophthalic anhydride based on the total weight of the composition and 0.3%, antimony trioxide based on the total weight of the composition. This mixture is then extruded at temperatures from about 200–210° C. through a 325 mesh screen and die to form strands which are then fed through cooling water and a cutter to form pellets. The pellets are then used as a textile-forming substance to form filaments in a known way through filament forming dyes from a bath of the melted polymer composition. The pelleting operation may, if desired, be omitted and filaments formed directly from the molten blend by use of suitable dyes.

In practicing the present invention, a polyolefin-polyamide composition such as that described above is extruded by known means into a ribbon form of filament 100 mils wide and of 1080 denier. The filaments can be woven into a primary backing material substantially in the manner described in the Rhodes patent. The fabric so formed can be manufactured into carpeting by tufting the backing with, for example, 3700 denier Antron Type 846 nylon, forming a pile height of ⅜ inch. The resulting carpet backing should have excellent self-extinguishing properties.

EXAMPLE 79

A polyolefin-polyamide composition (Pro-fax PC 812, Hercules, Inc.) is prepared as described in Examples 76, 77 and 78 above, and as further described in U.S. Pat. 3,433,853. This composition is mixed with 1.5%, 1,2,3,4,5-pentabromo-6-chlorocyclohexane based on the total weight of the composition, 1.2% tetrabromophthalic anhydride based on the total weight of the composition and 0.3%, antimony trioxide based on the total weight of the composition. The mixture is extruded into 500 denier XR ribbon and 1100 denier XR ribbon. The ribbon is woven into a closed weave fabric and tufted with Du Pont Antron Type 846 regular nylon 66 (hexamethylene adipamide). The resulting product should be an excellent self-extinguishing carpet backing.

EXAMPLES 80–83

The effects of a flame retardant composition of similar character to that of this invention was added to various polymeric materials to determine the level of flame retardant necessary for the material to self-extinguish in one second or less in the vertical upward position per 100 parts of the polymeric material.

The flame retarding composition of these examples consisted of the following:

| | Parts |
|---|---|
| Antimony trioxide ______________________________ | 1 |
| Tris(2,3-dibromopropyl) phosphate _______________ | 3 |
| Ethylene-bis[tris(2 - cyanoethyl)-phosphonium bromide] ________________________________________ | 3 |
| 1,2,3,4,5-pentabromo-6-chlorocyclohexane __________ | 3 |
| Victamide _____________________________________ | 3 |

The results are summarized in Table VII.

EXAMPLES 84–87

The amount of a flame retardant of this invention necessary to retard the flammability of various polymeric materials to cause the materials to self-extinguish in one second or less in the vertical upward position is determined.

A flame retarding composition of the following proportions is used:

| | Percent |
|---|---|
| 1,2,3,4,5-pentabromo-6-chlorocyclohexane __________ | 50 |
| Tetrabromophthalic anhydride _____________________ | 40 |
| Antimony trioxide ______________________________ | 10 |

This composition is added to the various polymeric materials to determine the level of the retardant composition necessary per 100 parts of the polymeric material.

The results should be as summarized in Table VII.

TABLE VII.—MINIMUM FIRE RETARDANT LOADING TO SELF-EXTINGUISH MATERIALS OF EXAMPLES 80–87

| Example | Material | Level of retardant composition |
|---|---|---|
| 80 | Polypropylene | 5 |
| 81 | Polyethylene-UCC DYNH-1 | 64 |
| 82 | Thiokol polysulfide ST compound | >60 |
| 83 | Thiokol acrylic rubber T-76 compound | 28 |
| 84 | Polypropylene | 3 |
| 85 | Polyethylene-UCC DYNH-1 | 55 |
| 86 | Thiokol polysulfide ST compound | >60 |
| 87 | Thiokol acrylic rubber T-76 compound | 33 |

I claim:
1. A flame retardant composition for rendering normally flammable polypropylene materials self-extinguishing when intimately incorporated therein comprising:
   (a) from about 20 to 60% by weight of 1,2,3,4,5-pentabromo-6-chlorocyclohexane based on the total weight of the composition;
   (b) from about 30 to 70% by weight of tetrabromophthalic anhydride based on the total weight of the composition and
   (c) from about 1 to 30% by weight of antimony trioxide based on the total weight of the composition.

2. A flame retarding composition for rendering normally flammable polypropylene materials self-extinguishing when intimately incorporated therein comprising:
   (a) from about 30 to 40% by weight of 1,2,3,4,5-pentabromo-6-chlorocyclohexane based on the total weight of the composition;
   (b) from about 50 to 60% by weight of tetrabromophthalic anhydride based on the total weight of the composition; and
   (c) from about 9 to 13% by weight of antimony trioxide based on the total weight of the composition.

3. The composition as in claim 2 wherein the 1,2,3,4,5-pentabromo-6-chlorocyclohexane is present in about 32 to 34% by weight based on the total weight of the composition.

4. The composition as in claim 3 wherein the tetrabromophthalic anhydride is present in about 54 to 56% by weight based on the total weight of the composition.

5. The composition as in claim 4 wherein the antimony trioxide is present in about 10 to 12% by weight based on the total weight of the composition.

6. A self-extinguishing polypropylene textile composition comprising:
   (a) from about 89 to 99% by weight of a synthetic textile polypropylene polymer based on the total weight of the composition;
   (b) from about 0.1 to 10% by weight of 1,2,3,4,5-pentabromo-6-chlorocyclohexane based on the total weight of the composition;
   (c) from about 0.1 to 10% by weight of tetrabromophthalic anhydride based on the total weight of the composition; and
   (d) from about 0.05 to 5% by weight of antimony trioxide based on the total weight of the composition.

7. The composition as in claim 6 wherein the polypropylene polymer is present in about 93 to about 98% by weight based on the total weight of the composition.

8. The composition as in claim 7 wherein the 1,2,3,4,5-pentabromo-6-chlorocyclohexane is present in about 1 to 6% by weight based on the total weight of the composition.

9. The composition as in claim 8 wherein the tetrabromophthalic anhydride is present in about 1 to 6% by weight based on the total weight of the composition.

10. The composition as in claim 9 wherein the antimony trioxide is present in about 0.1 to 2% by weight based on the total weight of the composition.

11. The composition of claim 6 wherein the self-extinguishing polypropylene textile is a carpet backing.

References Cited
UNITED STATES PATENTS

| | | | |
|---|---|---|---|
| 3,058,926 | 10/1962 | Eichhorn | 260—45.7 |
| 3,213,052 | 10/1965 | Lowes | 252—8.1 |
| 3,379,656 | 4/1968 | Eichhorn | 260—2.5 |
| 3,228,790 | 1/1966 | Sexsmith et al. | 161—170 |
| 3,354,191 | 11/1967 | Stivers | 260—45.7 |

DONALD E. CZAJA, Primary Examiner

V. P. HOKE, Assistant Examiner

U.S. Cl. X.R.

117—137; 161—170; 252—8.1; 260—41 B, 45.7 R, 45.8 A